United States Patent
Chen et al.

(10) Patent No.: US 10,204,108 B2
(45) Date of Patent: Feb. 12, 2019

(54) METHOD AND APPARATUS FOR MANUFACTURING FILE SYSTEM UPDATE PACKAGE, METHOD AND APPARATUS FOR UPDATING FILE SYSTEM UPDATE PACKAGE, AND TERMINAL

(71) Applicant: ZTE Corporation, Shenzhen (CN)

(72) Inventors: Xi Chen, Shenzhen (CN); Jianping Shuang, Shenzhen (CN); Chong Zhang, Shenzhen (CN)

(73) Assignee: XI'AN ZHONGXING NEW SOFTWARE CO., LTD., Xi'An (CN)

( * ) Notice: Subject to any disclaimer, the term of this patent is extended or adjusted under 35 U.S.C. 154(b) by 0 days.

(21) Appl. No.: 15/104,618

(22) PCT Filed: Jun. 5, 2014

(86) PCT No.: PCT/CN2014/079300
§ 371 (c)(1),
(2) Date: Jun. 15, 2016

(87) PCT Pub. No.: WO2014/180425
PCT Pub. Date: Nov. 13, 2014

(65) Prior Publication Data
US 2016/0313989 A1 Oct. 27, 2016

(30) Foreign Application Priority Data
Dec. 16, 2013 (CN) .......................... 2013 1 0690650

(51) Int. Cl.
*G06F 9/44* (2018.01)
*G06F 9/45* (2006.01)
(Continued)

(52) U.S. Cl.
CPC .......... *G06F 17/30082* (2013.01); *G06F 8/65* (2013.01); *G06F 8/654* (2018.02);
(Continued)

(58) Field of Classification Search
CPC ..... G06F 8/61; G06F 8/65; G06F 8/67; G06F 8/68; G06F 8/71
See application file for complete search history.

(56) References Cited

U.S. PATENT DOCUMENTS

| 6,493,871 | B1 | 12/2002 | McGuire |
| 7,543,118 | B1 * | 6/2009 | Chen ........................ G06F 8/65 |
| | | | 711/154 |

(Continued)

FOREIGN PATENT DOCUMENTS

| CN | 101778376 A | 7/2010 |
| CN | 102025708 A | 4/2011 |

(Continued)

OTHER PUBLICATIONS

Nikolai Samteladze, "Delta Encoding Based Methods to Reduce the Size of Smartphone Application Updates", Jan. 2013, University of South Florida, pp. 1-63; <https://scholarcommons.usf.edu/cgi/viewcontent.cgi?referer=https://www.google.com/&httpsredir=1&article=5770&context=etd >.*

(Continued)

*Primary Examiner* — S. Sough
*Assistant Examiner* — Ben C Wang
(74) *Attorney, Agent, or Firm* — Cantor Colburn LLP

(57) ABSTRACT

The method for manufacturing a file system update package includes: file information of each source file in a file system to be updated is acquired; an operation type of a target file corresponding to each source file is determined according to the file information of each source file, the operation type including one of a dynamic type, a static type and a recently-added type; when the operation type of the target file is the dynamic type or the recently-added type, the target file is compressed to form a compressed file package, and when the operation type of a certain target file is the static type, a differential operation is executed according to a (Continued)

difference between the target file and the corresponding source file to form a differential file package; and all the compressed file packages and all the differential file packages are packaged to form a file system update package.

14 Claims, 3 Drawing Sheets

(51) Int. Cl.
*G06F 17/30* (2006.01)
*G06F 8/65* (2018.01)
*G06F 8/658* (2018.01)
*G06F 8/654* (2018.01)
*G06F 8/61* (2018.01)
*G06F 8/71* (2018.01)

(52) U.S. Cl.
CPC ............... *G06F 8/658* (2018.02); *G06F 8/61* (2013.01); *G06F 8/71* (2013.01)

(56) References Cited

U.S. PATENT DOCUMENTS

| | | | |
|---|---|---|---|
| 9,170,804 B2* | 10/2015 | Schillinger | G06F 8/68 |
| 2006/0190939 A1* | 8/2006 | Chen | G06F 8/65 |
| | | | 717/168 |
| 2007/0067765 A1* | 3/2007 | Motta | G06F 8/68 |
| | | | 717/168 |
| 2007/0079306 A1* | 4/2007 | Qumei | G06F 8/68 |
| | | | 717/168 |
| 2007/0083571 A1* | 4/2007 | Meller | G06F 8/665 |
| 2007/0294385 A1 | 12/2007 | Kapadekar | |
| 2007/0294696 A1* | 12/2007 | Papakipos | G06F 9/5027 |
| | | | 718/102 |
| 2011/0231834 A1* | 9/2011 | Kim | G06F 1/3212 |
| | | | 717/173 |
| 2012/0094643 A1* | 4/2012 | Brisebois | H04W 8/245 |
| | | | 455/418 |
| 2012/0330905 A1* | 12/2012 | Artishdad | G06F 21/6218 |
| | | | 707/692 |
| 2014/0013006 A1* | 1/2014 | Schillinger | G06F 8/68 |
| | | | 709/247 |
| 2014/0057620 A1* | 2/2014 | Lin | G06F 8/654 |
| | | | 455/418 |
| 2014/0059534 A1* | 2/2014 | Daum | G06F 8/65 |
| | | | 717/172 |
| 2014/0129529 A1* | 5/2014 | Akelbein | G06F 17/30162 |
| | | | 707/693 |
| 2015/0082297 A1* | 3/2015 | Parry | G06F 8/654 |
| | | | 717/173 |
| 2015/0234647 A1* | 8/2015 | Lai | G06F 8/65 |
| | | | 717/169 |
| 2016/0124739 A1* | 5/2016 | Zongker | G06F 8/65 |
| | | | 717/172 |
| 2016/0266885 A1* | 9/2016 | Aleksandrov | G06F 8/65 |
| 2016/0266890 A1* | 9/2016 | Aleksandrov | G06F 8/65 |
| 2017/0090901 A1* | 3/2017 | Bainville | G06F 8/71 |
| 2017/0090903 A1* | 3/2017 | Bainville | G06F 8/71 |
| 2018/0074808 A1* | 3/2018 | O'Connor | G06F 8/65 |

FOREIGN PATENT DOCUMENTS

| | | |
|---|---|---|
| CN | 102693145 A | 9/2012 |
| CN | 102831001 A | 12/2012 |
| CN | 103336703 A | 10/2013 |
| CN | 103513998 A | 1/2014 |

OTHER PUBLICATIONS

Kiyohara et al., "Method for Fast Compression of Program Codes for Remote Updates in Embedded Systems", ACM, Mar. 2009, pp. 1683-1684; <https://dl.acm.org/citation.cfm?id=1529659>.*

Motta et al., "Differential Compression of Executable Code", IEEE, DCC'07, Mar. 2007, pp. 1-10; <https://ieeexplore.ieee.org/stamp/stamp.jsp?tp=&arnumber=4148749>.*

International Search Report for corresponding application No. PCT/CN2014/079300 filed on Jun. 5, 2014; dated Sep. 2, 2014.

European Search Report for corresponding application EP14795338; dated Oct. 28, 2016.

* cited by examiner

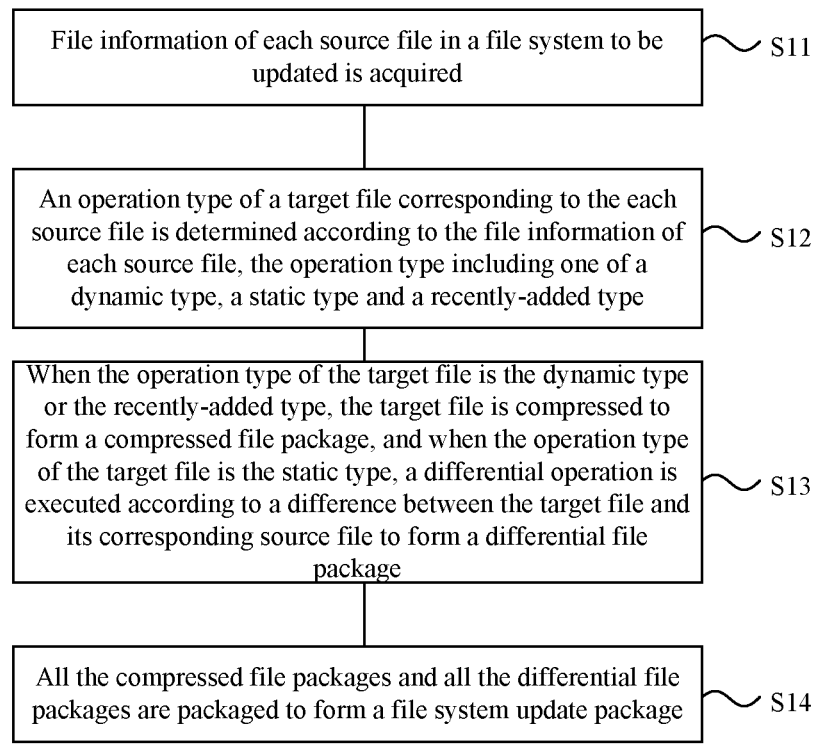
Fig. 1
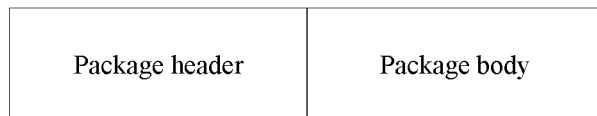
Fig. 2
| Length of package header of a file system update package | Length of package body of a file system update package | the number of contained differential file packages and the number of compressed file packages | Check code for differential file package | Total length of index information of each file system update package |
Fig. 3

METHOD AND APPARATUS FOR MANUFACTURING FILE SYSTEM UPDATE PACKAGE, METHOD AND APPARATUS FOR UPDATING FILE SYSTEM UPDATE PACKAGE, AND TERMINAL

TECHNICAL FIELD

The disclosure relates to the technical field of communications, and in particular to a method and apparatus for manufacturing a file system update package, a method and apparatus for updating a file system update package, and a terminal.

BACKGROUND

As a new terminal published by a terminal manufacturer appears on the market faster and faster, a software version of the terminal appearing on the market has some bugs or parts urgently needing to improve the user experience inevitably, or even has some critical faults urgently needing to be repaired. Generally, software of a terminal device can be updated by using a Firmware Update Over the Air (FOTA) method, updating solutions are enriched day by day, and updating requirements containing an updating requirement for a file system are complex increasingly.

Methods for updating a file system on the basis of an FOTA technology in the current industry adopt a differential updating mode. Namely, when an update package is provided, it is necessary to generate a differential update package by means of a certain differential algorithm between an original file system to be updated and a target file system formed after updating, and in an actual updating process of the terminal device, the original file system of the terminal device is updated to the target file system by utilizing the differential update package. Thus, due to the fact that the update package only involves different parts between the file systems in two versions and identical parts are not contained in an updating range, the manufactured update package is relatively small, and quick downloading and updating can be realized.

However, there is a limitation to these updating methods. Namely, updating is only allowed to be performed between the original file system and the target file system due to the adoption of the differential algorithm. That is, when it is necessary to update some dynamic files (for example, configuration items such as a default network type, a default screen locking duration and a default browser access point, which can be changed by a user via a menu finally) in the terminal device, a software provider for manufacturing an update package or a server cannot determine specific situations of source files due to the fact that a source file system has been changed by the user. Consequently, the differential update package cannot be manufactured by using the differential algorithm for the difference between a source file and a target file, and the range within which the file system can be updated in an FOTA mode is restricted to a great extent.

SUMMARY

The disclosure provides a method and apparatus for manufacturing a file system update package, a method for updating a file system update package, and a terminal, which are intended to solve the problem in the traditional art that dynamic files cannot be updated by FOTA.

According to one aspect of the disclosure, a method for manufacturing a file system update package is provided, which may include that:

file information of each source file in a file system to be updated is acquired; an operation type of a target file corresponding to each source file is determined according to the file information of each source file, the operation type including one of a dynamic type, a static type and a recently-added type; when the operation type of a certain target file is the dynamic type or the recently-added type, the target file is compressed to form a compressed file package, and when the operation type of a certain target file is the static type, a differential operation is executed according to a difference between the target file and its corresponding source file to form a differential file package; and all the compressed file packages and all the differential file packages are packaged to form a file system update package.

Preferably, the step that the file information of each source file in the file system to be updated is acquired may specifically include that: the file information of each source file in the file system to be updated is acquired by reading a configuration file.

Preferably, the file system update package may include a package body, and the package body may include data information and index information of each compressed file package, and data information and index information of each differential file package, an operation type parameter of each target file being contained in the corresponding index information.

Preferably, the step that all the compressed file packages and all the differential file packages are packaged to form the file system update package may specifically include that: the operation type of each target file is written into the index information of the corresponding compressed file package or the index information of the corresponding differential file package; and the data information and index information of all the compressed file packages and the data information and index information of all the differential file packages are packaged to form the file system update package, the index information being located at a first half part of the package body, and the data information being located at a second half part of the package body.

Preferably, the package body may further include deletion indication information which is used for indicating to delete the corresponding source files.

According to another aspect of the disclosure, a method for updating a file system is also provided, which may include that: a file system update package downloaded is parsed to determine an operation type of each target file in the file system update package, the operation type including one of a dynamic type, a static type and a recently-added type, the file system update package including compressed file packages and differential file packages, and each target file corresponding to a compressed file package or a differential file package; when the operation type of a certain target file is the dynamic type or the recently-added type, the compressed file package corresponding to the target file is decompressed to form a target file at a terminal so as to complete updating; and when the operation type of a certain target file is the static type, reduction calculation is performed on a source file in the file system to be updated of the terminal and the corresponding differential file package to form a target file at the terminal so as to complete updating.

Preferably, the step that the downloaded file system update package is parsed to determine the operation type of each target file in the file system update package may specifically include that: the file system update package is disassembled to obtain a package header and a package body, the package body including data information and index information of each compressed file package, and data information and index information of each differential file package, and an operation type parameter of each target file being contained in the corresponding index information; and the operation type of each target file in the file system update package is determined by reading the index information in the package body.

After the file system update package is disassembled to obtain the package header and the package body and before the operation type of each target file in the file system update package is determined by reading the index information in the package body, the method may further include that: the file system update package is checked by utilizing an update package check code in the package header to determine whether the file system update package is downloaded correctly.

Preferably, the step that the compressed file package corresponding to the target file is decompressed to form the target file at the terminal so as to complete updating when the operation type of the target file is the dynamic type or the recently-added type may specifically include that: the compressed file package corresponding to the target file is decompressed to form a target file; the formed target file is checked by utilizing the target file check code in the index information; and if checking is passed, a source file is replaced with the target file to complete updating, and if checking is not passed, the target file is discarded to give up updating.

According to another aspect of the disclosure, apparatus for manufacturing a file system update package is also provided, which may include: an acquisition element configured to acquire file information of each source file in a file system to be updated; a determination element configured to determine an operation type of a target file corresponding to each source file according to the file information of each source file, the operation type including one of a dynamic type, a static type and a recently-added type; a file packaging element configured to compress, when the operation type of a certain target file is the dynamic type or the recently-added type, the target file to form a compressed file package, and execute, when the operation type of a certain target file is the static type, a differential operation according to a difference between the target file and the corresponding source file to form a differential file package; and a file system packaging element configured to package all the compressed file packages and all the differential file packages to form a file system update package.

Preferably, the acquisition element may be specifically configured to acquire the file information of each source file in the file system to be updated by reading a configuration file.

Preferably, the file system update package may include a package body, and the package body may include data information and index information of each compressed file package, and data information and index information of each differential file package, an operation type parameter of each target file being contained in the corresponding index information.

Specifically, the file system packaging element may specifically include: a writing component configured to write the operation type of each target file into the index information of the corresponding compressed file package or the index information of the corresponding differential file package; and a packaging component configured to package the data information and index information of all the compressed file packages and the data information and index information of all the differential file packages to form the file system update package, the index information being located at a first half part of the package body, and the data information being located at a second half part of the package body.

Preferably, the package body may further include deletion indication information which is used for indicating to delete the corresponding source files.

According to another aspect of the disclosure, apparatus for updating a file system is also provided, which may include: a parsing element configured to parse a downloaded file system update package so as to determine an operation type of each target file in the file system update package, the operation type including one of a dynamic type, a static type and a recently-added type, the file system update package including compressed file packages and differential file packages, and each target file corresponding to a compressed file package or a differential file package; a decompression element configured to decompress, when the operation type of a certain target file is the dynamic type or the recently-added type, the compressed file package corresponding to each target file to form a target file at a terminal so as to complete updating; and a reduction element configured to perform, when the operation type of a certain target file is the static type, reduction calculation on a source file in the file system to be updated of the terminal and the corresponding differential file package to form a target file at the terminal so as to complete updating.

Preferably, the parsing element may include: a package disassembly component configured to disassemble the file system update package to obtain a package header and a package body, the package body including data information and index information of each compressed file package, and data information and index information of each differential file package, and an operation type parameter of each target file being contained in the corresponding index information; and a determination component configured to determine the operation type of each target file in the file system update package by reading the index information in the package body.

Furthermore, the apparatus may further include: an update package checking component configured to check the file system update package by utilizing an update package check code in the package header to determine whether the file system update package is downloaded correctly.

Preferably, the decompression element may specifically include: a decompression component configured to decompress the compressed file package corresponding to each target file to form a target file; a target file checking component configured to check the target file formed after being decompressed by the decompression component by utilizing the target file check code in the index information; and an updating component configured to replace, if checking is passed, a source file with the target file to complete updating, and discard, if checking is not passed, the target file to give up updating.

According to another aspect of the disclosure, a terminal is also provided, which may include the above apparatus for updating the file system provided by the embodiments of the disclosure.

According to the method and apparatus for manufacturing the file system update package, the method and apparatus for updating the file system update package, and the terminal, provided by the embodiments of the disclosure, the file information of each source files in the file system to be updated is acquired, the operation type of the target file corresponding to each source file is determined according to the file information of each source file, when the operation type of a certain target file is the dynamic type or the recently-added type, the target file is compressed to form the compressed file package, and when the operation type of a certain target file is the static type, the differential operation is executed according to the difference between the target file and the corresponding source file to form the differential file package. Thus, the target file with the dynamic type or the recently-added type and the target file with the static type are processed in a distinguished manner, so that the target files in different operation types can be packaged into an update package, thereby greatly expanding the updating range of the file system in an FOTA mode.

BRIEF DESCRIPTION OF THE DRAWINGS

FIG. 1 shows a flowchart of a method for manufacturing a file system update package according to an embodiment of the disclosure;

FIG. 2 shows a diagram of a file system update package manufactured by using the method for manufacturing a file system update package according to an embodiment of the disclosure;

FIG. 3 shows a structural diagram of a package header in FIG. 2;

DETAILED DESCRIPTION OF THE EMBODIMENTS

Figure 4:
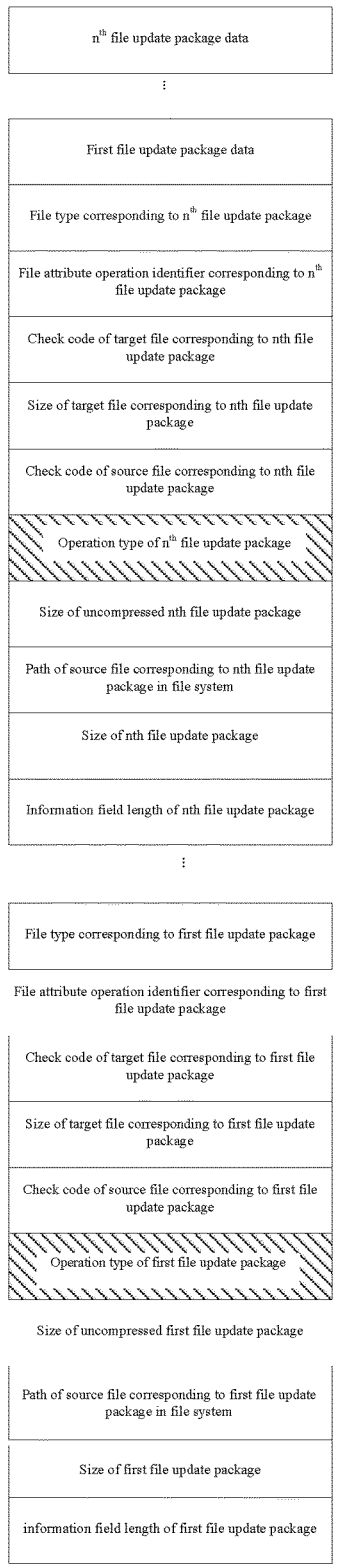
FIG. 4 shows a structural diagram of a package body in FIG. 2.

The disclosure is further described below with reference to the drawings in detail. It should be understood that the embodiments described here are only intended to explain the disclosure, and do not limit the disclosure.

As shown in FIG. 1, an embodiment of the disclosure provides a method for manufacturing a file system update package, which includes Step S11 to Step S14 as follows.

S11: File information of each source file in a file system to be updated is acquired.

S12: An operation type of a target file corresponding to the each source file is determined according to the file information of each source file, the operation type including one of a dynamic type, a static type and a recently-added type.

S13: When the operation type of the target file is the dynamic type or the recently-added type, the target file is compressed to form a compressed file package, and when the operation type of the target file is the static type, a differential operation is executed according to a difference between the target file and its corresponding source file to form a differential file package.

S14: All the compressed file packages and all the differential file packages are packaged to form a file system update package.

According to the method for manufacturing the file system update package provided by the embodiment of the disclosure, the file information of each source file in the file system to be updated is acquired, the operation type of the target file corresponding to the each source file is determined according to the file information of each source file, when the operation type of the target file is the dynamic type or the recently-added type, the target file is compressed to form the compressed file package, when the operation type of the target file is the static type, the differential operation is executed according to the difference between the target file and its corresponding source file to form the differential file package, and all the compressed file packages and all the differential file packages are packaged to form the file system update package. Thus, the target files with the dynamic type or the recently-added type and the target file with the static type are processed in a distinguished manner, so that the target files with different operation types may be packaged into an update package, thereby greatly expanding the updating range of the file system in an FOTA mode.

It should be noted that an update package of the file system is generally manufactured by a software provider, and the update package is downloaded by a terminal on a server and operates to complete updating of the file system of the terminal. When delivery, the terminal has been provided with a certain file system, and the software provider keeps relevant records about source files of the file system and a specific installation position of each source file in the terminal. Consequently, when the file system is updated, the software provider may comprehensively master source files to be updated and various pieces of file information of target files formed after updating, thereby manufacturing a compressed file system package by utilizing these pieces of file information.

In the file system to be updated, the file information of each source file in the file system to be updated may be recorded by a configuration file. In Step S11, when it is necessary to acquire the file information of each source file in the file system to be updated, the file information of each source file in the file system to be updated may be acquired by reading the configuration file. Preferably, these pieces of file information may include the size of a file, a storage position, an operation type, an access right, a check code and the like, wherein the operation type is a parameter set according to judgement whether the file can be changed by a user. The operation type of a file which cannot be changed by the user is a static type, and the operation type of a file which can be changed by means of settings of the user is a dynamic type. According to the operation type of each source file to be updated, the operation type of the corresponding target file formed after updating may be determined. For example, if an operation type of a certain source file is the dynamic type, an operation type of the corresponding target file formed after updating is also the dynamic type, and an update package may be manufactured in accordance with a dynamic type operation method. It should be noted that each target file is formed by updating or improving the corresponding source file, so that some target files may belong to recently-added files, and there are not source files corresponding thereto. These recently-added files are not the dynamic type or the static type. The operation type of each recently-added file is defined as another type namely a recently-added type.

In the embodiment of the disclosure, the operation type of the target file may be one of the followings: the dynamic type, the static type and the recently-added type. Different update package manufacturing methods are adopted for different operation types, in order that all files in the file system may be updated according to update packages manufactured by using the methods.

Specifically, in Step S13, different file update packages are correspondingly formed by target files with different operation types. When the operation type of a certain target file is the dynamic type, it is shown that the corresponding source file can be modified by the user, corresponding source files of different terminals are different, and a differential operation method is not applied to updating of these source files, so that the source files can be omitted, and the target file is directly compressed to form a compressed file package. When the operation type of a certain target file is the recently-added type, it is shown that the corresponding source file does not exist in the file system to be updated virtually, so that the target file can be directly compressed to form a compressed file package. When the operation type of a certain target file is the static type, it is shown that the corresponding source file cannot be modified by the user, and factory settings of the source file are still kept, so that the differential operation is executed according to the difference between the target file and its corresponding source file to form a differential file package.

After the corresponding differential file package or compressed file package is manufactured for each target file, in Step S14, these compressed file packages and differential file packages may be packaged to form a file system update package. A specific structure of the file system update package is not limited by the embodiment of the disclosure. For example, in one embodiment of the disclosure, structures of an update package manufactured by using the update package manufacturing method according to the embodiment may be shown in FIG. 2 to FIG. 4. FIG. 2 shows an overall structure of a file system update package. FIG. 3 shows a specific structure of a package header in FIG. 2. FIG. 4 shows a specific structure of a package body in FIG. 2.

With reference to FIG. 2 to FIG. 4, it can be seen that the file system update package in the embodiment mainly includes a package header and a package body. The package body includes data information and index information of each compressed file package and data information and index information of each differential file package, wherein an operation type parameter of the corresponding target file is included in the index information of each compressed file package and the index information of each file update package. The package header mainly describes the length of the package header, the length of the package body, the number of the compressed file packages, the number of the differential file packages, an update package check code, and the total length of the index information and the like of the entire file system update package. These pieces of package header information are mainly used for parsing the entire file system.

The package body of the file system update package includes the data information and index information of each compressed file package (for a dynamic type file or a recently-added type file), and the data information and index information of each differential file package (for a static type file), wherein the operation type parameter of the corresponding target file is included in the index information of each compressed file package and the index information of each file update package.

The index information may, for example, include information such as a source file path corresponding to each differential file package and each compressed file package, check codes of source and target files, rights of the source and target files, and operation types; and the data information mainly includes valid data for updating each source file by means of the corresponding compressed file package or differential file package.

The index information and the data information can be stored in the package body in an appropriate mode as needed. But, preferably, as shown in FIG. 4, the data information of each differential file package and the data information of each compressed file package are located at a second half part of the package body, and the index information of each differential file package and the index information of each compressed file package are located at a first half part of the package body. Thus, when the package body of the file system update package is read, these pieces of index information can be read firstly, so that information such as check codes of corresponding files can be quickly obtained, thereby aiding in increase of a checking speed and reduction of resource consumption.

Preferably, the package body may further include deletion indication information which is used for indicating to delete the corresponding source files.

Specifically speaking, in Step S14, the step that all the compressed file packages and all the differential file packages are packaged to form the file system update package may specifically include Step 1 to Step 2 as follows.

Step 1: The operation type of each target file is written into the index information of the corresponding compressed file package or the index information of the corresponding differential file package.

Step 2: The data information and index information of all the compressed file packages and the data information and index information of all the differential file packages are packaged to form the file system update package, the index information being located at the first half part of the package body, and the data information being located at the second half part of the package body.

Figure 5:
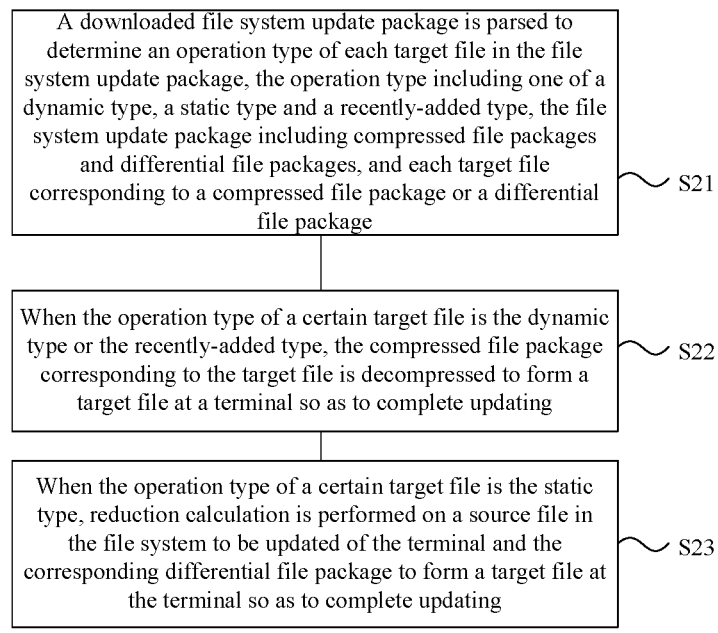
FIG. 5 shows a flowchart of a method for updating a file system according to an embodiment of the disclosure.

Correspondingly, an embodiment of the disclosure also provides a method for updating a file system. As shown in FIG. 5, the method may include Step S21 to Step S23 as follows.

S21: A downloaded file system update package is parsed to determine an operation type of each target file in the file system update package, the operation type including one of a dynamic type, a static type and a recently-added type, the file system update package including compressed file packages and differential file packages, and each target file corresponding to a compressed file package or a differential file package.

S22: When the operation type of a certain target file is the dynamic type or the recently-added type, the compressed file package corresponding to the target file is decompressed to form a target file at a terminal so as to complete updating.

S23: When the operation type of a certain target file is the static type, reduction calculation is performed on a source file in the file system to be updated of the terminal and the corresponding differential file package to form a target file at the terminal so as to complete updating.

According to the method for updating the file system provided by the embodiment of the disclosure, the downloaded file system update package is parsed to determine the operation type of each target file in the file system update package, when the operation type of a certain target file is the dynamic type or the recently-added type, the compressed file package corresponding to the target file is decompressed to form the target file at the terminal so as to complete updating, and when the operation type of a certain target file is the static type, reduction calculation is performed on the source file in the file system to be updated of the terminal and the corresponding differential file package to form the target file at the terminal so as to complete updating. Thus, the target files in the dynamic type and the recently-added type and the target file in the static type are processed in a distinguished manner, thereby greatly expanding the updating range of the file system in an FOTA mode.

Specifically speaking, in Step S21, the step that the downloaded file system update package is parsed to determine the operation type of each target file in the file system update package may include Step 1 to Step 2 as follows.

Step 1: The file system update package is disassembled to obtain a package header and a package body, the package body including data information and index information of each compressed file package, and data information and index information of each differential file package, and an operation type parameter of each target file being contained in the corresponding index information.

Step 2: The operation type of each target file in the file system update package is determined by reading the index information in the package body.

In view of that the file system update package is downloaded from a server by the terminal, the downloaded file system update package may be wrong due to an error in a data transmission process, and updating of the file system may be seriously affected if the update package is adopted rashly. In order to avoid this situation, preferably, after the file system update package is disassembled to be separated into the package header and the package body and before the operation type of each target file in the file system update package is determined by reading the index information in the package body, the method may further include that: the file system update package is checked by utilizing an update package check code in the package header to determine whether the file system update package is downloaded correctly. If so, subsequent operations are carried out. Otherwise, a series of subsequent operations will be stopped, and a file system update package is re-downloaded.

Preferably, different updating methods are adopted for target files with different operation types. For example, when the operation type of a certain target file is the static type, reduction calculation is performed on a source file in the file system to be updated of the terminal and the corresponding differential file package to form a target file at the terminal so as to complete updating; and when the operation type of a certain target file is the dynamic type or the recently-added type, it is necessary to decompress the compressed file package corresponding to the target file to form a target file at the terminal so as to complete updating.

Specifically speaking, the method for updating the source file corresponding to the target file of which the operation type is the dynamic type or the recently-added type may include Step 1 to Step 3 as follows.

Step 1: The compressed file package corresponding to the target file is decompressed to form a target file.

Step 2: The formed target file is checked by utilizing a target file check code in the index information.

Step 3: If checking is passed, the corresponding source file is replaced with the target file to complete updating, and if checking is not passed, the target file is discarded to give up updating.

Figure 6:
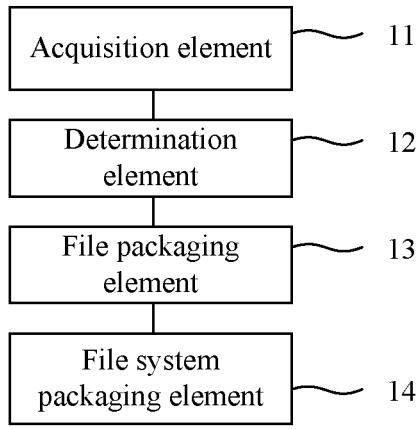
FIG. 6 is a structural diagram of apparatus for manufacturing a file system update package according to an embodiment of the disclosure.

Correspondingly, as shown in FIG. 6, the disclosure also provides apparatus for manufacturing a file system update package, which includes: an acquisition element 11 configured to acquire file information of each source file in a file system to be updated; a determination element 12 configured to determine an operation type of a target file corresponding to each source file according to the file information of each source file, the operation type including one of a dynamic type, a static type and a recently-added type; a file packaging element 13 configured to compress, when the operation type of a certain target file is the dynamic type or the recently-added type, the target file to form a compressed file package, and execute, when the operation type of a certain target file is the static type, a differential operation according to a difference between the target file and the corresponding source file to form a differential file package; and a file system packaging element 14 configured to package all the compressed file packages and all the differential file packages to form a file system update package.

According to the apparatus for manufacturing a file system update package provided by the embodiment of the disclosure, the acquisition element 11 may acquire the file information of each source file in the file system to be updated, the determination element 12 may determine the operation type of the target file corresponding to each source file according to the file information of each source file, when the operation type of a certain target file is the dynamic type or the recently-added type, the file packaging element 13 may compress the target file to form the compressed file package, when the operation type of a certain target file is the static type, the file packaging element 13 may execute the differential operation according to the difference between the target file and its corresponding source file to form the differential file package, and the file system packaging element 14 may package all the compressed file packages and all the differential file packages to form the file system update package. Thus, the target file with the dynamic type or the recently-added type and the target file in the static type are processed in a distinguished manner, so that the target files in different operation types can be manufactured into an update package, thereby greatly expanding the updating range of the file system in an FOTA mode.

Specifically, the acquisition element 11 may be specifically configured to acquire the file information of each source file in the file system to be updated by reading a configuration file.

The file system update package includes a package body, and the package body includes data information and index information of each compressed file package, and data information and index information of each differential file package, an operation type parameter of each target file being contained in the corresponding index information. Furthermore, the package body further includes deletion indication information which is used for indicating to delete the corresponding source files.

Preferably, the file system packaging element 14 specifically includes: a writing component configured to write the operation type of each target file into the index information of the corresponding compressed file package or the index information of the corresponding differential file package; and a packaging component configured to package the data information and index information of all the compressed file packages and the data information and index information of all the differential file packages to form the file system update package, the index information being located at a first half part of the package body, and the data information being located at a second half part of the package body.

Figure 7:
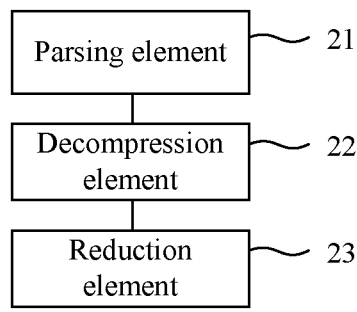
FIG. 7 is a structural diagram of apparatus for updating a file system according to an embodiment of the disclosure.

Correspondingly, as shown in FIG. 7, the disclosure also provides apparatus for updating a file system, which includes: a parsing element 21 configured to parse a downloaded file system update package to determine an operation type of each target file in the file system update package, the operation type including one of a dynamic type, a static type and a recently-added type, the file system update package including compressed file packages and differential file packages, and each target file corresponding to a compressed file package and a differential file package; a decompression element 22 configured to decompress, when the operation type of a certain target file is the dynamic type or the recently-added type, the compressed file package corresponding to the target file to form a target file at a terminal to complete updating; and a reduction element 23 configured to perform, when the operation type of a certain target file is the static type, reduction calculation on a source file in the file system to be updated of the terminal and the corresponding differential file package to form a target file at the terminal to complete updating.

According to the updating apparatus for a file system provided by the embodiment of the disclosure, the downloaded file system update package may be parsed by the parsing element 21 to determine the operation type of each target file in the file system update package, when the operation type of a certain target file is the dynamic type or the recently-added type, the decompression element 22 may decompress the compressed file package corresponding to the target file to form the target file at the terminal so as to complete updating, and when the operation type of a certain target file is the static type, the reduction element 23 can perform reduction calculation on the source file in the file system to be updated of the terminal and the corresponding differential file package to form the target file at the terminal so as to complete updating. Thus, the target files in the dynamic type and the recently-added type and the target file in the static type are processed in a distinguished manner, thereby greatly expanding the updating range of the file system in an FOTA mode.

Specifically, the parsing element 21 may include: a package disassembly component configured to disassemble the file system update package to obtain a package header and a package body, the package body including data information and index information of each compressed file package, and data information and index information of each differential file package, and an operation type parameter of each target file being contained in the corresponding index information; and a determination component configured to determine the operation type of each target file in the file system update package by reading the index information in the package body.

Furthermore, the apparatus for updating the file system provided by the embodiment of the disclosure may further include: an update package checking component configured to check the file system update package by utilizing an update package check code in the package header to determine whether the file system update package is downloaded correctly.

Preferably, the decompression element 22 may specifically include a decompression component configured to decompress the compressed file package corresponding to each target file to form a target file; a target file checking component configured to check the target file formed after being decompressed by the decompression component by utilizing the target file check code in the index information; and an updating component configured to replace, if checking is passed, a source file with the target file to complete updating, and discard, if checking is not passed, the target file to give up updating.

Correspondingly, an embodiment of the disclosure also provides a terminal, which includes the apparatus for updating a file system provided by the embodiment of the disclosure. Thus, corresponding beneficial effects may be achieved, which have been described above in detail and will not be repeated here.

Although the preferred embodiments of the disclosure have been disclosed on the basis of the aim of giving an example, those skilled in the art will be aware of a possibility of various improvements, additions and replacements. Thus, the scope of the disclosure shall not be limited to the embodiments.

INDUSTRIAL APPLICABILITY

In the embodiments of the disclosure, the file information of each source file in the file system to be updated is acquired, the operation type of the target file corresponding to each source file is determined according to the file information of each source file, when the operation type of a certain target file is the dynamic type or the recently-added type, the target file is compressed to form the compressed file package, when the operation type of a certain target file is the static type, the differential operation is executed according to the difference between the target file and the corresponding source file to form the differential file package, and all the compressed file packages and all the differential file packages are packaged to form the file system update package. Thus, the target files in the dynamic type and the recently-added type and the target file in the static type are processed in a distinguished manner, so that the target files in different operation types may be manufactured into an update package, thereby greatly expanding the updating range of the file system in an FOTA mode.

What is claimed is:

1. A computer-implemented method for manufacturing a file system update package, comprising:
    acquiring file information of each of a plurality of source files in a file system to be updated;
    determining, from an operation type parameter, an operation type of a target file corresponding to each source file according to the file information of the source file, the operation type including one of a dynamic type, a static type and a recently-added type;
    for each target file, when the operation type of the target file is the dynamic type or the recently-added type, compressing the target file to form a compressed file package, and when the operation type of the target file is the static type, executing a differential operation according to a difference between the target file and its corresponding source file to form a differential file package; and
    packaging all the compressed file packages, all the differential file packages into a) a package body comprising data information and index information of each of the compressed file packages and data information and index information of each of the differential file packages, and b) the operation type parameter of each target file used to form the file packages, to form a file system update package,
    wherein the index information of each of the compressed and differential file packages contains the operation type parameter of the target file used to form the respective file package and is located at the first half part of the package body, and
    wherein the data information of each of the compressed and differential file packages is located at the second half part of the package body.

2. The method according to claim 1, wherein acquiring the file information of each of the plurality of source files in the file system to be updated comprises:
acquiring the file information of each source file by reading a configuration file.

3. The method according to claim 1, wherein packaging all the compressed file packages and all the differential file packages to form the file system update package further comprises:
writing the operation type of each target file into the index information of the corresponding compressed file package or the index information of the corresponding differential file package.

4. The method according to claim 1, wherein the package body further comprises deletion indication information used for indicating to delete a corresponding source file.

5. A computer-implemented method for updating a file system, comprising:
parsing a downloaded file system update package to determine, from an operation type parameter, an operation type of each of a plurality of target files used to form the file system update package, the operation type including one of a dynamic type, a static type and a recently-added type, the file system update package including a plurality of compressed file packages and differential file packages, with each file package formed by a corresponding target file;
for each of the plurality of compressed file packages and differential file packages, when the operation type of the corresponding target file is the dynamic type or the recently-added type, decompressing the compressed file package corresponding to the target file to form a target file at a terminal to update the file system and
when the operation type of the corresponding target file is the static type, performing reduction calculation on a source file corresponding to the target file in the file system and differential file package corresponding to the target file to form a target file at the terminal to update the file system;
wherein parsing the downloaded file system update package downloaded to determine the operation type of each of a plurality of target files used to form the file system update package comprises:
disassembling the downloaded file system update package to obtain a package header and a package body, wherein the package body comprises data information and index information of each of the plurality of compressed file packages, and data information and index information of each of the plurality of differential file packages,
wherein the index information of each of the compressed and differential file packages contains the operation type parameter of the target file used to form the respective file package and is located at the first half part of the package body, and
wherein the data information of each of the compressed and differential file packages is located at the second half part of the package body and
determining the operation type of each target file in the file system update package by reading the index information in the package body containing the operation type parameters.

6. The method according to claim 5, wherein after the file system update package is disassembled to obtain the package header and the package body and before the operation type of each target file in the file system update package is determined by reading the index information in the package body, the method further comprises:
checking the file system update package by utilizing an update package check code in the package header to determine whether the file system update package is downloaded correctly.

7. The method according to claim 5, wherein decompressing the compressed file package corresponding to the target file to form the target file at the terminal to complete updating when the operation type of the target file is the dynamic type or the recently-added type comprises:
decompressing the compressed file package corresponding to the target file to form a target file;
checking the formed target file by utilizing a target file check code in the index information; and
based on that checking is passed, replacing a source file with the target file to complete updating, and based on that checking is not passed, discarding the target file to give up updating.

8. Apparatus for manufacturing a file system update package, comprising a hardware processor configured to execute program units stored on a memory, wherein the program units comprising:
an acquisition element configured to acquire file information of each of a plurality of source files in a file system to be updated;
a determination element configured to determine, from an operation type parameter, an operation type of a target file corresponding to the each source file according to the file information of the source file, the operation type including one of a dynamic type, a static type and a recently-added type;
a file packaging element configured to compress, for each target file, when the operation type of the target file is the dynamic type or the recently-added type, the target file to form a compressed file package, and execute, when the operation type of a certain target file is the static type, a differential operation according to a difference between the target file and its corresponding source file to form a differential file package; and
a file system packaging element configured to package all the compressed file packages, all the differential file packages into a) a package body comprising data information and index information of each of the compressed file packages and data information and index information of each of the differential file packages, and b) the operation type parameter of each target file used to form the file packages, to form a file system update package;
wherein the index information of each of the compressed and differential file packages contains the operation type parameter of the target file used to form the respective file package and is located at the first half part of the package body, and
wherein the data information of each of the compressed and differential file packages is located at the second half part of the package body.

9. The apparatus according to claim 8, wherein the acquisition element is specifically configured to acquire the file information of each source file in the file system to be updated by reading a configuration file.

10. The apparatus according to claim 8, wherein the file system packaging element further comprises:
a writing component configured to write the operation type of each target file into the index information of the corresponding compressed file package or the index information of the corresponding differential file package.

11. The apparatus according to claim 8, wherein the package body further comprises deletion indication information which is used for indicating to delete the corresponding source files.

12. Apparatus for updating a file system, comprising a hardware processor configured to execute program units stored on a memory, wherein the program units comprising:
   a parsing element configured to parse a downloaded file system update package to determine, from an operation type parameter, an operation type of each of a plurality of target files used to form the file system update package, the operation type including one of a dynamic type, a static type and a recently-added type, the file system update package including a plurality of compressed file packages and differential file packages, with each file package formed by a corresponding target file;
   a decompression element configured to decompress, for each of the plurality of compressed file packages and differential file packages, when the operation type of the corresponding target file is the dynamic type or the recently-added type, the compressed file package corresponding to the target file to form a target file at a terminal to update the file system; and
   a reduction element configured to perform, when the corresponding operation type of the target file is the static type, reduction calculation on a source file corresponding to the target file in the file system and the differential file package corresponding to the target file to form a target file at the terminal to update the file system;
   wherein the parsing element comprises:
   a package disassembly component configured to disassemble the downloaded file system update package to obtain a package header and a package body, wherein the package body comprises data information and index information of each of the plurality of compressed file package, and data information and index information of each differential file packages, and data information and index information of each of the plurality of differential file packages;
   wherein the index information of each of the compressed and differential file packages contains the operation type parameter of the target file used to form the respective file package and is located at the first half part of the package body, and
   wherein the data information of each of the compressed and differential file packages is located at the second half part of the package body; and
   a determination component configured to determine the operation type of each target file in the file system update package by reading the index information in the package body containing the operation type parameter.

13. The apparatus according to claim 12, the program units further comprising:
   an update package checking component configured to check the file system update package by utilizing an update package check code in the package header to determine whether the file system update package is downloaded correctly.

14. The apparatus according to claim 12, wherein the decompression element comprises:
   a decompression component configured to decompress the compressed file package corresponding to the target file to form a target file;
   a target file checking component configured to check the target file formed after being decompressed by the decompression component by utilizing the target file check code in the index information; and
   an updating component configured to replace, based on that checking is passed, a source file with the target file to complete updating, and discard, based on that checking is not passed, the target file to give up updating.

* * * * *